US010379844B2

(12) United States Patent
Scott et al.

(10) Patent No.: US 10,379,844 B2
(45) Date of Patent: Aug. 13, 2019

(54) VALIDATING USER INTERFACE TEMPLATES FOR SOFTWARE PROBE CONFIGURATION

(71) Applicant: CA, Inc., New York, NY (US)

(72) Inventors: Anthony Dewayne Scott, Fort Collins, CO (US); Jake John Paul Boeckerman, Fort Collins, CO (US)

(73) Assignee: CA, Inc., New York, NY (US)

( * ) Notice: Subject to any disclaimer, the term of this patent is extended or adjusted under 35 U.S.C. 154(b) by 84 days.

(21) Appl. No.: 15/472,769

(22) Filed: Mar. 29, 2017

(65) Prior Publication Data
US 2018/0285237 A1 Oct. 4, 2018

(51) Int. Cl.
G06F 8/70 (2018.01)
G06F 8/71 (2018.01)
G06F 8/36 (2018.01)
G06F 9/451 (2018.01)
G06F 9/445 (2018.01)
G06F 11/36 (2006.01)

(52) U.S. Cl.
CPC .............. G06F 8/71 (2013.01); G06F 8/36 (2013.01); G06F 8/70 (2013.01); G06F 9/44505 (2013.01); G06F 9/44552 (2013.01); G06F 9/451 (2018.02); G06F 11/3604 (2013.01)

(58) Field of Classification Search
None
See application file for complete search history.

(56) References Cited

U.S. PATENT DOCUMENTS

| 6,141,699 A | 10/2000 | Luzzi et al. | |
|---|---|---|---|
| 7,178,144 B2* | 2/2007 | Melchione | G06F 8/61 709/221 |
| 7,979,898 B2* | 7/2011 | Zarenin | G06F 21/105 717/168 |
| 2013/0145349 A1* | 6/2013 | Basak | G06F 9/44505 717/121 |

* cited by examiner

Primary Examiner — Francisco J Aponte
Assistant Examiner — Mark A Gooray
(74) Attorney, Agent, or Firm — Gilliam IP PLLC

(57) ABSTRACT

To ensure that probe configuration information is accurate, UI templates are validated against probe configuration files. A UI template validation system retrieves a template which indicates configuration information for a particular probe type and retrieves a configuration file for the probe type. The configuration file indicates a set of key-value pairs for various settings that can be implemented by the probe. For example, a configuration file may include a key "probe_timeout" which indicates that the probe has a configurable setting for a timeout period. The system validates the configuration information in the template by ensuring that each key indicated in the template matches a key in the probe configuration file. Additionally, the system also ensures that any default values paired with keys in the configuration file are accurately indicated in the template.

20 Claims, 5 Drawing Sheets

VALIDATING USER INTERFACE TEMPLATES FOR SOFTWARE PROBE CONFIGURATION

BACKGROUND

The disclosure generally relates to the field of data processing, and more particularly to software development, installation, and management.

Management software for monitoring information technology (IT) infrastructure, such as routers, servers, applications, etc., utilizes a variety of probes for measuring and reporting metrics for analytics. For example, probes can be utilized monitor hardware usage, software performance, network performance, etc. Components in the infrastructure can be instrumented with probe program code that executes on the component to perform the desired monitoring services. Probes can be configured through a user interface (UI) that allows for modification of probe settings, such as measurements to be taken, reporting interval, etc.

BRIEF DESCRIPTION OF THE DRAWINGS

Aspects of the disclosure may be better understood by referencing the accompanying drawings.

DESCRIPTION

The description that follows includes example systems, methods, techniques, and program flows that embody aspects of the disclosure. However, it is understood that this disclosure may be practiced without these specific details. For instance, this disclosure refers to validating UI templates for probe configuration in illustrative examples. Aspects of this disclosure can be also applied to validating templates for product information in an online marketplace. In other instances, well-known instruction instances, protocols, structures and techniques have not been shown in detail in order not to obfuscate the description.

Introduction

IT infrastructure may be instrumented with hundreds or thousands of probes to monitor hardware and software components. Each component may require a compatible probe type for monitoring the component. For example, a web server may require a web server probe designed by the web server software provider. An administration console for configuring the large number and variety of probes needs to accurately display configuration information for each probe type.

Overview

To ensure that probe configuration information is accurate, UI templates are validated against probe configuration files. A UI template validation system retrieves a template which indicates configuration information for a particular probe type and retrieves a configuration file for the probe type. The configuration file indicates a set of key-value pairs for various settings that can be implemented by the probe. For example, a configuration file may include a key "probe_timeout" which indicates that the probe has a configurable setting for a timeout period. The system validates the configuration information in the template by ensuring that each key indicated in the template matches a key in the probe configuration file. Additionally, the system also ensures that any default values paired with keys in the configuration file are accurately indicated in the template.

Example Illustrations

Figure 1:
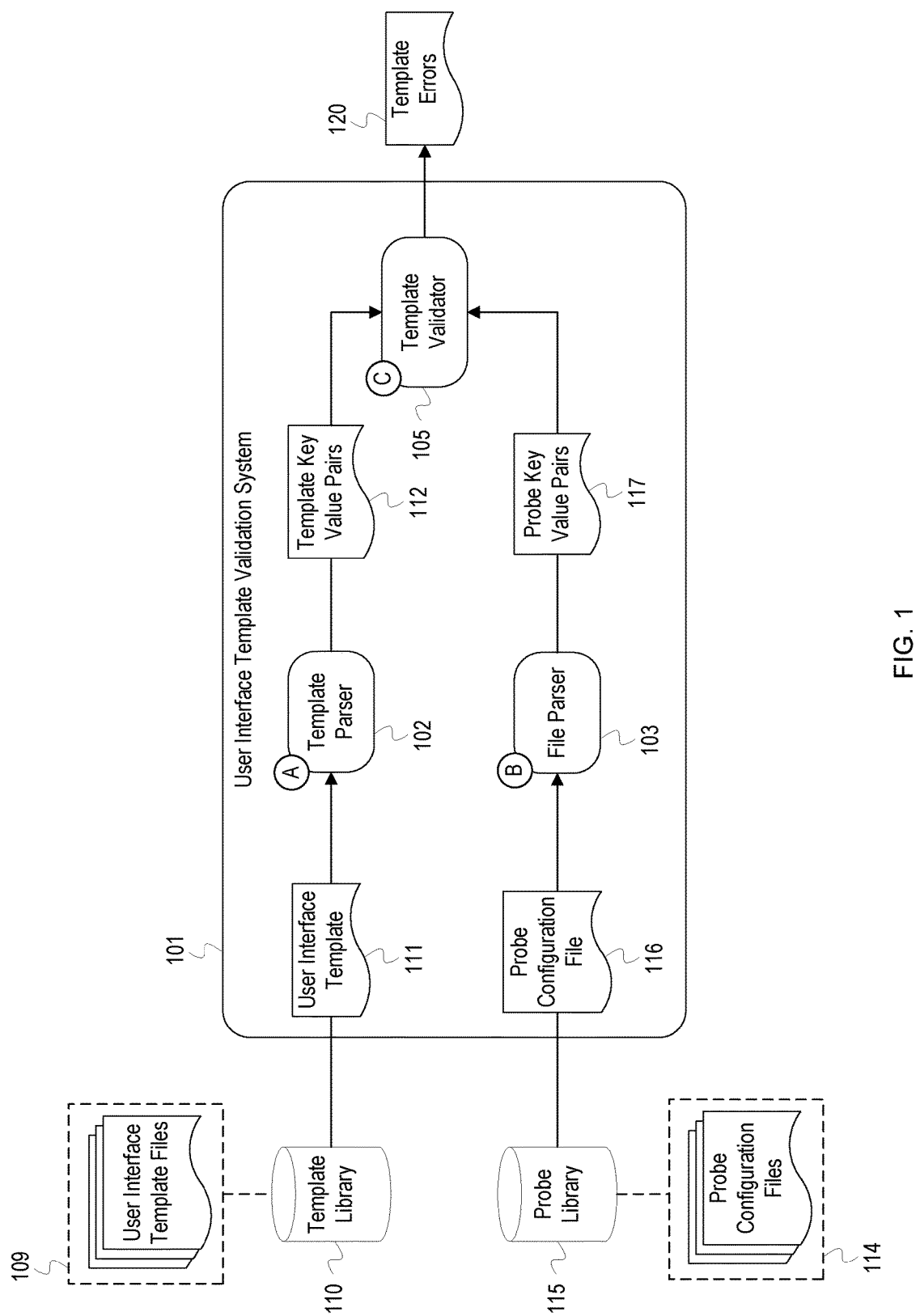
FIG. 1 depicts an example user interface template validation system for validating UI templates against probe configuration files.

FIG. 1 depicts an example user interface template validation system for validating UI templates against probe configuration files. FIG. 1 depicts a UI template validation system 101 that includes a template parser 102, a file parser 103, and a template validator 105. The UI template validation system 101 is communicatively coupled to a template library 110 and a probe library 115.

The template library 110 includes a number of UI template files 109 that will be utilized by a console or probe management software to allow for configuration of probes through a UI. Each of the UI template files 109 corresponds to a particular probe type. For example, a template file may include configuration information for a probe designed to monitor network traffic at a router. The UI template files 109 also indicate UI elements that will be displayed by probe management software and allow for input/modification of probe settings. For example, a template can indicate that a text input box should be displayed for a probe setting and indicate that an input value should map to a key or setting of a probe. The probe library 115 includes or indicates a location for probe configuration files 114 that include lists of key-value pairs corresponding to settings for a probe. Each of the probe configuration files may have a unique list of key-value pairs based on the settings allowed by a particular probe type. The probe configuration files 114 may be provided by a developer of a probe and may change as probe program code is updated.

At stage A, the template parser 102 retrieves a UI template 111 from the template library 110. The template parser 102 retrieves the UI template 111 as part of an iterative process for validating templates in the template library 110. After retrieving the UI template 111, the template parser 102 analyzes the UI template 111 to identify a probe type or probe identifier and communicates the information to the file parser 103.

At stage B, the file parser 103 retrieves a probe configuration file 116 from the probe library 115. The probe configuration file 116 corresponds to a probe configuration described by the UI template 111. The file parser 103 queries the probe library 115 using the identifier or the probe type received from the template parser 102 to retrieve the probe configuration file 116.

The template parser 102 parses the UI template 111 to identify template key-value pairs 112, and the file parser 103 parses the probe configuration file 116 to identify probe key-value pairs 117. The keys in the probe key-value pairs 117 correspond to settings or configurations that a corresponding probe is capable of interpreting and implementing. For example, a key "reporting_interval" may correspond to how frequently a probe transmits recorded metrics. Some of the keys in the probe key-value pairs 117 may be associated with a default value, e.g. the "reporting_interval" key may have a default value of 5 seconds. Other keys in the probe key-value pairs 117 may not be associated with a value or may be associated with a value of 0 or null. Similarly, the template key-value pairs 112 include keys which correspond to settings for configuring a probe and default values. The template parser 102 and the file parser 103 parse the UI template 111 and the probe configuration file 116 based on a data or file format. For example, the UI template 111 may be in an extensible markup language (XML) format. The template parser 102 can parse the XML to identify tags or attributes which indicate a key-value pair and record the identified key-value pair. The probe configuration file 116 may be in a JavaScript Object Notation (JSON) format. The file parser 103 similarly analyzes the JSON document and records identified key-value pairs.

At stage C, the template validator 105 compares the template key-value pairs 112 and the probe key-value pairs 117 to identify template errors 120. Template errors can include mismatched keys, missing keys, missing values, incorrect default values, incorrect measurement units, etc. For example, the template key-value pairs 112 may include a key for a timeout setting that reads "probe_timeout," while the corresponding key in the probe key-value pairs 117 simply reads "timeout." This key mismatch is reported as an error in the template errors 120. If the template key-value pairs 112 contain keys not indicated in the probe key-value pairs 117, the template validator 105 indicates the keys in the template errors 120. The template validator 105 may flag these keys as "not needed" or "no corresponding probe key." Conversely, if the probe key-value pairs 117 includes keys not listed in the template key-value pairs 112, the template validator 105 indicates the keys or values in the template errors 120 and may flag these keys as "missing from UI template." If the template key-value pairs 112 includes values which differ from the probe key-value pairs 117, the template validator 105 indicates the mismatched values in the template errors 120. In some implementations, the template validator 105 may correct the values for the corresponding keys in the UI template 111 and indicate the corrections/changes in the template errors 120. Additionally, the template validator 105 can verify that other information matches between the template key-value pairs 112 and the probe key-value pairs 117, such as units for values (e.g., seconds, milliseconds, megabytes, etc.), ranges of possible values (e.g., 0-100), etc.

In some implementations, the template validator 105 also validates UI elements associated with the template key-value pairs 112 in the UI template 111. The template validator 105 can analyze the UI template 111 to ensure that a correct type of input field is associated with a key-value pair. For example, the template validator 105 can ensure that key-value pairs which accept only a true or false value are associated with a checkbox, that key-value pairs which accept strings as values are associated with a text input box, and that keys with an enumerated list of values are associated with radio buttons or a dropdown box. The template validator 105 can validate the UI elements by searching the UI template 111 for program code that indicates a user input and determining a corresponding key. For example, if the UI template 111 uses HTML, the template validator 105 may identify program code such as "<input type="text" name="Key1">" and determine that a text input field is associated with the key "Key1." The template validator 105 then verifies that the probe key-value pairs 117 or the probe configuration file 116 indicates that the key "Key1" is configured to receive text as a value. If "Key1" is not configured to receive text as a value, the template validator 105 indicates a UI element error in the template errors 120 for the UI template 111.

Additionally, in some implementations, the template validator 105 or another process of the UI template validation system 101 can remove unnecessary key-value pairs or modify default values based on an end user's needs or intended usage of the probes. The template validator 105 receives usage parameters which can include particular probe settings to be utilized, desired default values, alarm thresholds, etc. The template validator 105 retains key-value pairs in the UI template 111 that correspond to the settings, values, or thresholds identified in the information and remove other key-value pairs. For example, if a user is not concerned with bandwidth metrics, the template validator 105 may remove key-value pairs pertaining to bandwidth, such as bandwidth usage, bandwidth alarms, bandwidth metric reporting, etc. The template validator 105 may also replace default or blank values in the UI template 111 with default values indicated by the end user. For example, the template validator 105 may receive information indicating that a default alarm threshold for processor utilization should be 85% and associate the key for processor alarm threshold with a value of 85%. The template validator 105 can indicate the modifications to the UI template 111 in the template errors 120.

The above operations describe one iteration of a process for validating the UI template files 109 in the template library 110. After validating the UI template 111, the template parser 102 may continue retrieving templates from the template library 110 until each template has been validated. After each of the UI template files 109 has been validated against the probe configuration files 114, the UI template validation system 101 displays the template errors 120 for a developer or administrator to review. In implementations where the UI template validation system 101 automatically implements corrections to the UI template files 109, the UI template validation system 101 displays a list of modified templates and indicates that an update for the UI template files 109 should be distributed.

The UI template validation system 101 can reperform the validation process for the UI template files 109 periodically, after detecting changes/updates to the UI template files 109, after detecting changes/updates to the probe configuration files 114, etc. For example, the UI template validation system 101 receive a message indicating that the probe corresponding to the probe configuration file 116 has been updated. In response to the message, the UI template validation system 101 retrieves the UI template 111 for validation against the updated probe configuration file 116.

FIG. 1 is annotated with a series of letters A-C. These letters represent stages of operations. Although these stages are ordered for this example, the stages illustrate one example to aid in understanding this disclosure and should not be used to limit the claims. Subject matter falling within the scope of the claims can vary with respect to the order and some of the operations.

Figure 2:
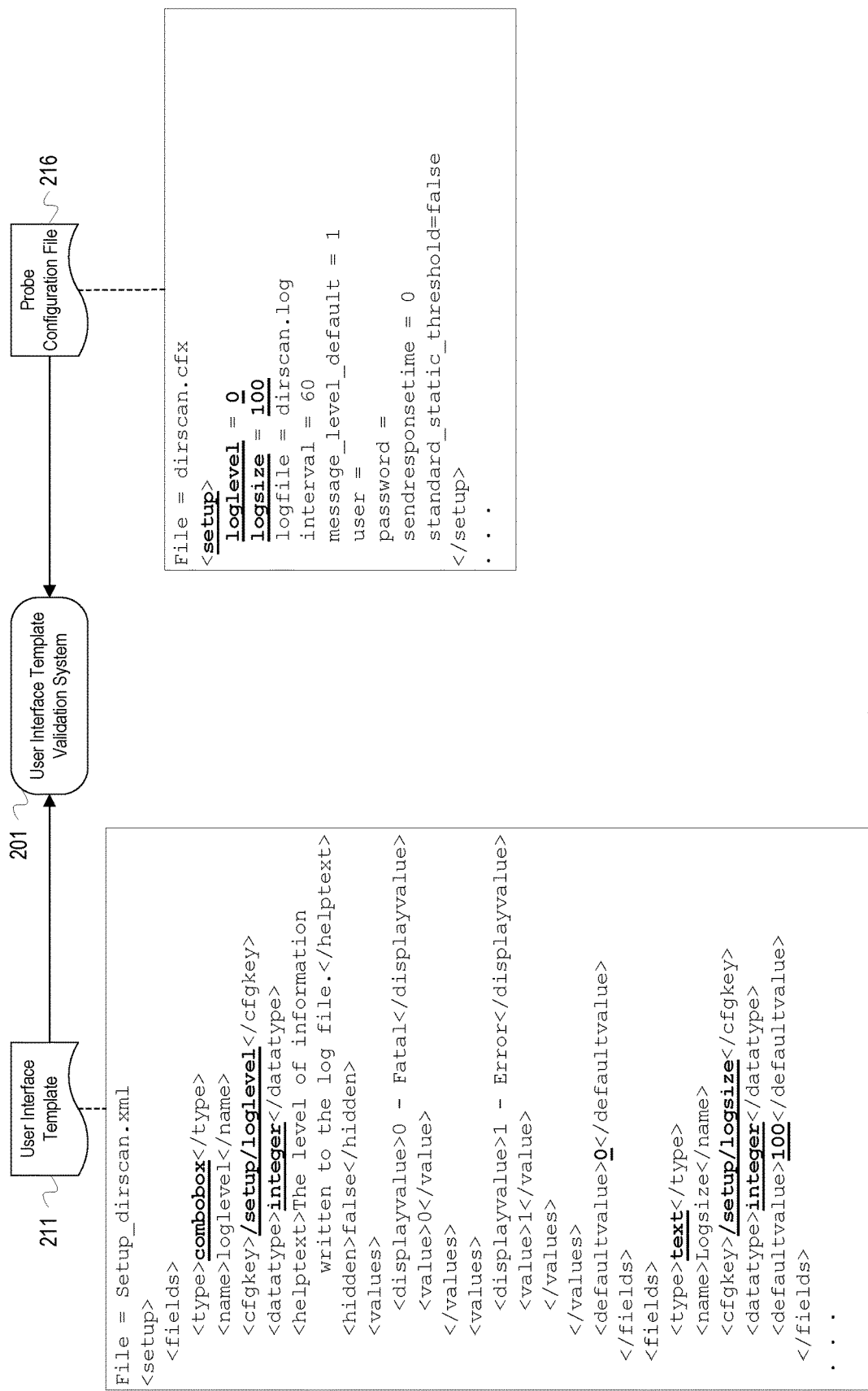
FIG. 2 depicts an example template and an example probe configuration file being analyzed by a user interface template validation system.

FIG. 2 depicts an example template and an example probe configuration file being analyzed by a user interface template validation system. FIG. 2 depicts a UI template validation system 201 ("validation system 201") receiving a UI template 211 and a probe configuration file 216.

The configuration file 216 is titled "dirscan.cfx" and indicates a portion of available settings for a directory scan probe that monitors a file directory. In particular, as emphasized in FIG. 2, the configuration file 216 indicates a key "loglevel" with a default value of 0 and a key "logsize" with a default value of 100. These two keys are grouped within a list of settings for "setup" of the directory scan probe.

The template 211 is titled "Setup_dirscan.xml" and indicates a portion of UI elements that will be displayed in a graphical user interface utilized for configuring the directory scan probe. In particular, as emphasized in FIG. 2, the template 211 includes UI elements for the "loglevel" key and the "logsize" key identified in the configuration file 216. The template 211 includes the full name for the configuration keys of "/setup/loglevel" and "/setup/logsize." Additionally, the template 211 indicates default values for the keys, types of UI input elements, and data types for the input values. For the "loglevel" key, the template 211 includes a default value of 0, a UI input type of "combobox," and a data type of "integer." For the "logsize" key, the template 211 includes a default value of 100, a UI input type of "text," and a data type of "integer."

The validation system 201 validates the template 211 against the configuration file 216 to ensure that the keys indicated in the template 211 correspond to settings for the directory scan probe as indicated in the configuration file 216. In FIG. 2, the validation system 201 parses the template 211 and the configuration file 216 to identify the keys and determines that the keys in the template 211 match keys in the configuration file 216. The validation system 201 also determines that the default values in the template 211 are equal to default values in the configuration file 216.

Additionally, the validation system 201 determines that the UI elements corresponding to the keys in the template 211 ("combobox" and "text") are capable of receiving input for the keys. The validation system 201 may verify the UI elements by determining a data type of the default values in the configuration file 216. The validation system 201 then ensures that the UI elements can receive the data type as an input. If, for example, the UI element for the "loglevel" key was a checkbox, the validation system 201 may determine that the UI element is not capable of receiving an integer value for the "loglevel" key, which is the data type indicated by the default value in the configuration file 216. The validation system 201 also ensures that the data type associated with the UI element in the template 211 matches the determined default value data type. If, for example, the validation system 201 determined that the default value for the "logsize" was a floating point data type, the validation system 201 would indicate an error for the data type "integer" associated with the "logsize" key in the template 211, since the integer data type cannot store a floating point value.

Figure 3:
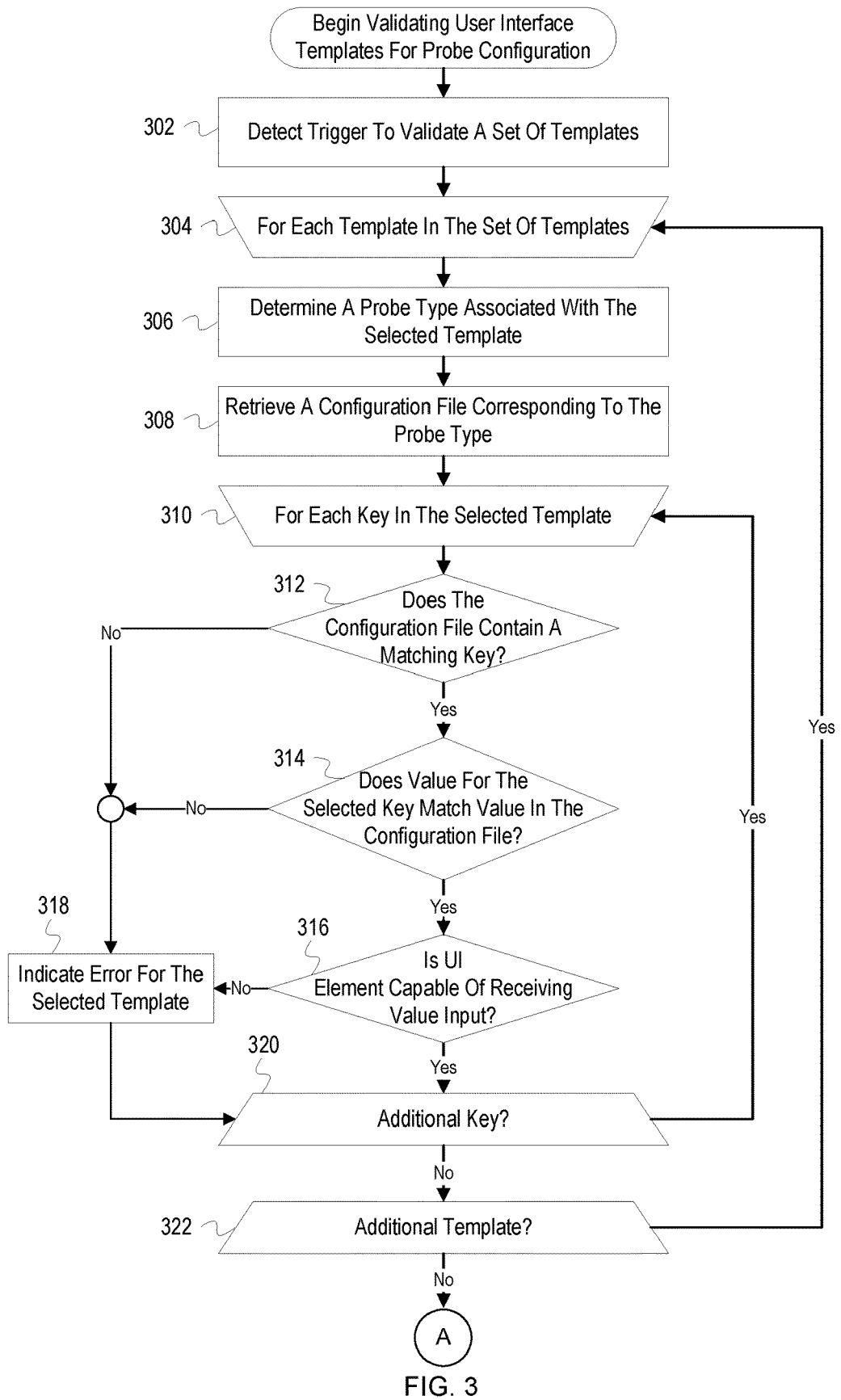
FIG. 3 depicts a flowchart with example operations for validating UI templates for probe configuration.
Figure 4:
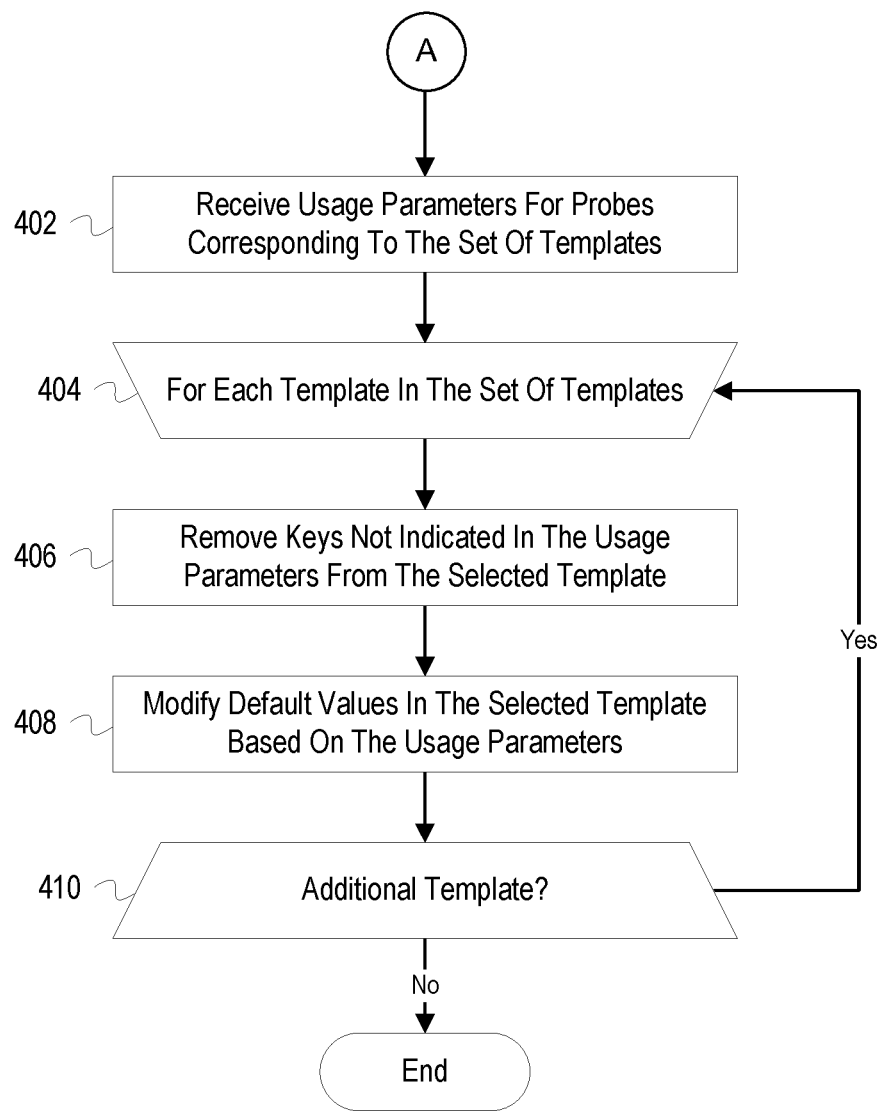
FIG. 4 depicts a continuation of a flowchart with example operations for validating UI templates for probe configuration.

FIGS. 3 and 4 depict a flowchart with example operations for validating UI templates for probe configuration. FIGS. 3 and 4 describe a UI template validation system as performing the operations for naming consistency with FIGS. 1 and 2, although naming or identification of program code can vary among implementations.

A UI template validation system ("system") detects a trigger to validate a set of UI templates (302). The trigger may be that one or more probes were updated, that one or more templates were updated, an input or instruction to validate the set of templates, expiration of a time period, etc. In response to detecting the trigger, the system begins the validation process by determining the set of templates to be validated. A user can input the set of templates into the system, or the system can identify templates to validate based on which templates have been modified, which probes have been updated, etc. For example, if the system detected that a probe was updated, the system determines a type of the probe and then retrieves one or more templates corresponding to the probe type. As an additional example, if the system detected a modification to template program code or a change in a template version number, the system retrieves the modified or updated template for validation.

The system begins validating each of the templates in the set of templates (304). The template currently being validated is hereinafter referred to as "the selected template."

The system determines a probe type associated with the selected template (306). The system can determine the probe type based on a name of the template, header information in the template, or a probe type indication in the template. For example, if the template is an XML file, the system searches the template for attributes or elements which indicate a probe type or probe identifier.

The system retrieves a configuration file corresponding to the probe type (308). The system searches a probe library or database using the probe type to identify an entry for a corresponding probe. The probe library may include the configuration file or may include a field indicating a file path for the configuration file. The system retrieves the configuration file from the probe library or from the indicated file path.

The system begins validating each key in the selected template (310). The system may first parse the selected template to generate a list of keys in the template and then iterate through the list to validate each key. The key of the selected template currently being validated is hereinafter referred to as "the selected key."

The system determines whether the configuration file contains a key that matches the selected key (312). The system searches the configuration file using the selected key. If the search is successful, the system determines that the configuration file contains a key that matches the selected key. A matching key indicates that the selected key is a valid setting or parameter for the probe associated with the configuration file. If the search is unsuccessful, the system determines that the configuration file does not contain a matching key.

If the system determines that the configuration file contains a key that matches the selected key, the system determines whether a value for the matching key in the configuration file matches a value for the selected key (314). Some keys may be associated with default values. If the selected key is associated with a value, the system verifies whether the value of the selected key matches a value indicated in the configuration file. The system may also determine whether a unit of measure for the value matches a unit indicated in the configuration file.

If the system determines that a value for the matching key in the configuration file matches a value for the selected key, the system determines whether a UI element associated with the selected key is capable of receiving input for the value (316). The system may parse the selected template to determine a type of UI element input associated with the selected key. The system then determines whether the UI element is capable of receiving a value for the selected key. For example, the system may determine that the selected key allows a true/false value and determine that a text input field is not a suitable UI element for the selected key.

If the system determines that the configuration file does not contain a matching key (312), that a value for a matching key does not match a value for the selected key (314), or that the UI element associated with the selected key is not capable of receiving input for the selected key value (316), the system indicates an error for the selected template (318). The system may display a list of errors for the template in a UI indicating missing keys, key mismatches, incorrect values, unsuitable UI elements, etc. The system may also display the errant program code of the selected template and suggest modifications. In some implementations, the system waits until the entire set of templates has been validated prior to displaying errors for the templates.

After determining that a UI element associated with the selected key is capable of receiving input for the value (316) or after indicating an error for the selected template (318), the system determines whether there is an additional key in the selected template (320). If there is an additional key in the selected template, the system selects the next key (310).

If there is not an additional key in the selected template, the system determines whether there is an additional template (322). If there is an additional template, the system selects the next template (304).

The flowchart of FIG. 3 continues to FIG. 4 as indicated by the flowchart connector A. If there is not an additional template, the system analyzes usage parameters for probes corresponding to the set of templates (402). The system receives or is configured with parameters that indicate configuration settings, metrics, or alarms to be used for a given probe deployment. For example, the parameters may indicate that temperature metrics for a server probe will be utilized and that an alarm threshold of 80 degrees Celsius should be a default value for the probe. The system analyzes the usage parameters and determines keys that will be utilized for each of the probes. For example, based on parameters indicating that temperature metrics will be utilized, the system determines that keys for configuring temperature settings and alarms should be retained. In this example, the system may identify keys to retain based on a search for keys that include "temperature" or "temp."

The system begins updating each of the templates in the set of templates based on the usage parameters (404). The template currently being updated is hereinafter referred to as "the selected template."

The system removes keys not indicated in the usage parameters from the selected template (406). Based on the analysis of the usage parameters, the system identifies and removes keys that will not be utilized during probe deployment. For example, if the usage parameters do not indicate that processor metrics will be collected, the system removes keys related to processor metrics from the selected template.

The system modifies default values in the selected template based on the usage parameters (408). If the usage parameters include default values for particular settings, the system identifies corresponding keys and updates the value accordingly for the key-value pair. For example, the usage parameters may specify a default metric reporting interval of 30 seconds. The system updates the reporting interval value in the selected template to 30 seconds.

The system determines whether there is an additional template (410). If there is an additional template, the system selects the next template (404). If there is not an additional template, the process ends.

Variations

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operations depicted at block 406 of FIG. 4 can be performed prior to block 310 of FIG. 3. Additionally, the operation depicted at block 316 of FIG. 3 may not be performed. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

Some operations above iterate through sets of items, such as templates and keys. In some implementations, the templates and keys may be iterated over according to an ordering (e.g., alphabetical, numerical), an indication of importance, etc. The number of iterations for loop operations may vary. Different techniques for analyzing the templates and keys may require fewer iterations or more iterations. For example, multiple keys may be validated in parallel.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 5:
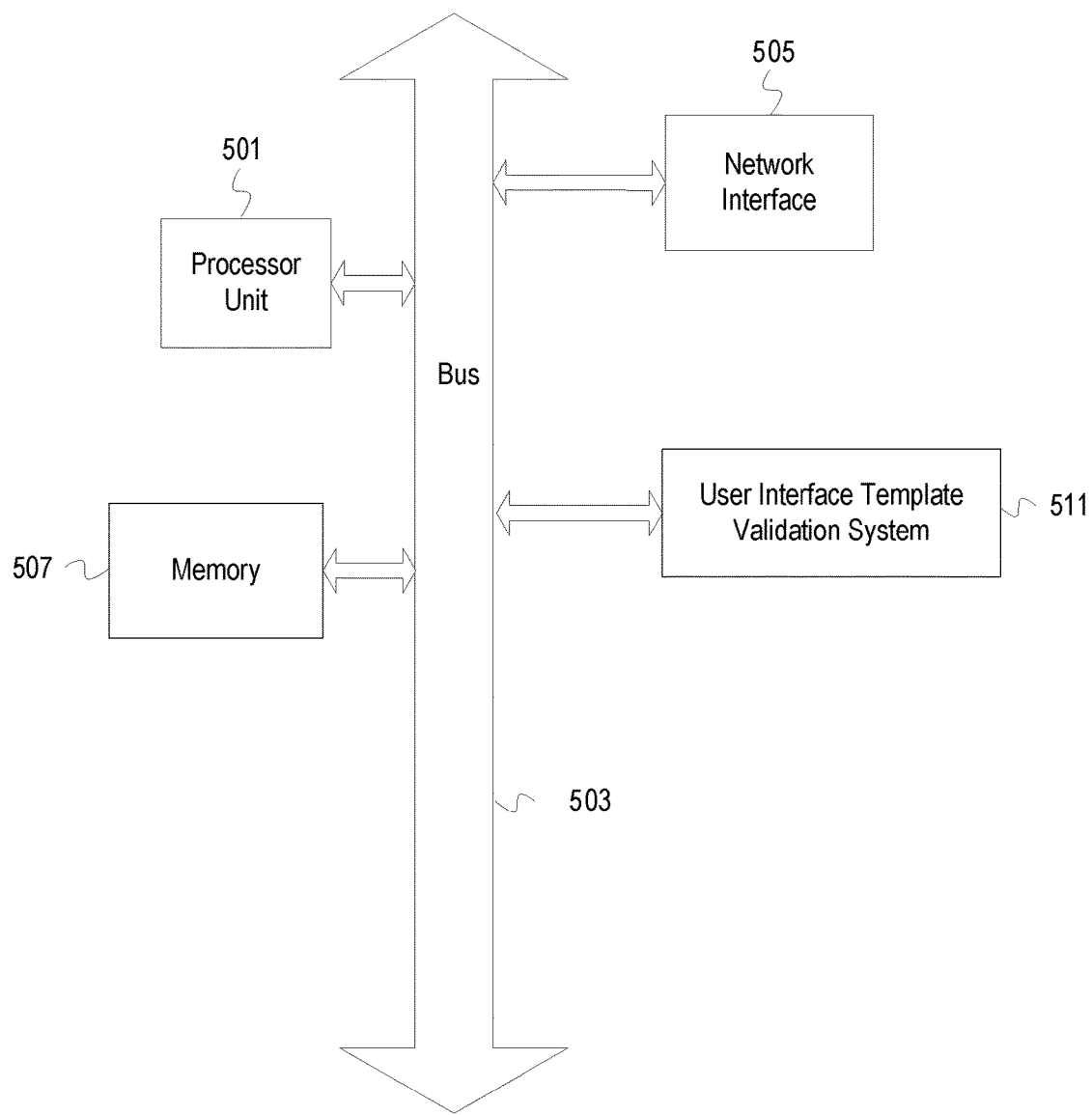
FIG. 5 depicts an example computer system with a user interface template validation system.

FIG. 5 depicts an example computer system with a UI template validation system. The computer system includes a processor unit 501 (possibly including multiple processors, multiple cores, multiple nodes, and/or implementing multi-threading, etc.). The computer system includes memory 507. The memory 507 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 503 (e.g., PCI, ISA, PCI-Express, Hyper-Transport® bus, InfiniBand® bus, NuBus, etc.) and a network interface 505 (e.g., a Fiber Channel interface, an Ethernet interface, an internet small computer system interface, SONET interface, wireless interface, etc.). The system also includes a UI template validation system 511. The UI template validation system 511 validates templates for configuring probes. Any one of the previously described functionalities may be partially (or entirely) implemented in hardware and/or on the processor unit 501. For example, the functionality may be implemented with an application specific integrated circuit, in logic implemented in the processor unit 501, in a co-processor on a peripheral device or card, etc. Further, realizations may include fewer or additional components not illustrated in FIG. 5 (e.g., video cards, audio cards, additional network interfaces, peripheral devices, etc.). The processor unit 501 and the network interface 505 are coupled to the bus 503. Although illustrated as being coupled to the bus 503, the memory 507 may be coupled to the processor unit 501.

While the aspects of the disclosure are described with reference to various implementations and exploitations, it will be understood that these aspects are illustrative and that the scope of the claims is not limited to them. In general, techniques for validating UI templates as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

What is claimed is:

1. A method comprising:
   detecting a trigger to validate a template, wherein the template comprises program code indicating user interface elements for configuring a probe;
   retrieving a probe configuration file based, at least in part, on a probe type associated with the template; and
   for each key indicated in the template,
      determining whether the key is indicated in the probe configuration file;
      based on determining that the key is not indicated in the probe configuration file,
         indicating an error;
      based on determining that the key is indicated in the probe configuration file,
         parsing the template to identify a first user interface element associated with the key;
         parsing the probe configuration file to identify potential values for the key; and
         based on determining that the first user interface element cannot receive data types corresponding to the potential values, indicating an error for the first user interface element of the template; and
      based on determining that the key is not indicated in usage parameters for the probe, removing the key from the template.

2. The method of claim 1 further comprising:
   based on identifying a matching key in the probe configuration file,
      identifying a value associated with the matching key in the probe configuration file; and
      based on determining that the matching key value does not equal a value associated with the key in the template, updating the template key value with the matching key value.

3. The method of claim 2 further comprising:
   identifying a unit of measurement associated with the matching key value; and
   based on determining that a different unit of measurement is associated with the template key value, changing the different unit of measurement for the template key value to the unit of measurement associated with the matching key value.

4. The method of claim 1, wherein the usage parameters for the probe comprise at least one of keys to be utilized, default values for keys, and alarm thresholds.

5. The method of claim 1 further comprising based on the usage parameters for the probe, modifying default values for keys in the template.

6. The method of claim 1, wherein detecting the trigger to validate the template comprises at least one of:
   determining that the template has been modified;
   determining that the probe was updated; and
   determining that a time period has expired.

7. The method of claim 1, wherein determining, for each key, whether the key is indicated in the probe configuration file comprises:

parsing the probe configuration file to generate a list of keys; and determining whether the list of keys comprises the key.

8. The method of claim 1 further comprising:

generating a user interface for configuring the probe based, at least in part, on the template; and receiving, via the user interface, probe configuration values corresponding to the keys indicated in the template for configuration of the probe for deployment in a network.

9. The method of claim 1, wherein determining that the first user interface element cannot receive data types corresponding to the potential values comprises:

determining that the potential values for the key comprise a true value and a false value; and determining that the first user interface element is not a checkbox.

10. One or more non-transitory machine-readable media comprising program code for validating a template for configuring a probe, the program code to:

detect a trigger to validate the template, wherein the template comprises program code indicating user interface elements for configuring the probe;

retrieve a probe configuration file based, at least in part, on a probe type associated with the template; and for each key indicated in the template, determine whether the key is indicated in the probe configuration file; and based on a determination that the key is not indicated in the probe configuration file, indicate an error;

based on a determination that the key is indicated in the probe configuration file, parse the template to identify a first user interface element associated with the key;

parse the probe configuration file to identify potential values for the key; and based on a determination that the first user interface element cannot receive data types corresponding to the potential values, indicate an error for the first user interface element of the template; and based on a determination that the key is not indicated in usage parameters for the probe, remove the key from the template.

11. The machine-readable media of claim 10 further comprising program code to:

based on identification of a matching key in the probe configuration file, identify a value associated with the matching key in the probe configuration file; and based on a determination that the matching key value does not equal a value associated with the key in the template, update the template key value with the matching key value.

12. An apparatus comprising:

a processor; and a machine-readable medium having program code executable by the processor to cause the apparatus to, detect a trigger to validate a template, wherein the template comprises program code indicating user interface elements for configuring a probe;

retrieve a probe configuration file based, at least in part, on a probe type associated with the template; and for each key indicated in the template, determine whether the key is indicated in the probe configuration file; and based on a determination that the key is not indicated in the probe configuration file, indicate an error;

based on a determination that the key is indicated in the probe configuration file, parse the template to identify a first user interface element associated with the key;

parse the probe configuration file to identify potential values for the key; and based on a determination that the first user interface element cannot receive data types corresponding to the potential values, indicate an error for the first user interface element of the template; and based on a determination that the key is not indicated in usage parameters for the probe, remove the key from the template.

13. The apparatus of claim 12, further comprising program code executable by the processor to cause the apparatus to:

based on identification of a matching key in the probe configuration file, identify a value associated with the matching key in the probe configuration file; and based on a determination that the matching key value does not equal a value associated with the key in the template, update the template key value with the matching key value.

14. The apparatus of claim 13 further comprising program code executable by the processor to cause the apparatus to:

identify a unit of measurement associated with the matching key value; and based on a determination that a different unit of measurement is associated with the template key value, change the different unit of measurement for the template key value to the unit of measurement associated with the matching key value.

15. The apparatus of claim 12, wherein the usage parameters for the probe comprise at least one of keys to be utilized, default values for keys, and alarm thresholds.

16. The apparatus of claim 12, further comprising program code executable by the processor to cause the apparatus to, based on the usage parameters for the probe, modify default values for keys in the template.

17. The apparatus of claim 12, wherein the program code executable by the processor to cause the apparatus to detect the trigger to validate the template comprises program code executable by the processor to cause the apparatus to at least one of:

determine that the template has been modified;

determine that the probe was updated; and determine that a time period has expired.

18. The apparatus of claim 12, wherein the program code executable by the processor to cause the apparatus to determine, for each key, whether the key is indicated in the probe configuration file comprises program code executable by the processor to cause the apparatus to:

parse the probe configuration file to generate a list of keys; and determine whether the list of keys comprises the key.

19. The apparatus of claim 12 further comprising program code executable by the processor to cause the apparatus to:

generate a user interface for configuring the probe based, at least in part, on the template; and receive, via the user interface, probe configuration values corresponding to the keys indicated in the template for configuration of the probe for deployment in a network.

20. The apparatus of claim 12, wherein the program code executable by the processor to cause the apparatus to determine that the first user interface element cannot receive data types corresponding to the potential values comprises program code executable by the processor to cause the apparatus to:
  determine that the potential values for the key comprise a true value and a false value; and
  determine that the first user interface element is not a checkbox.

\* \* \* \* \*